Figure 1:
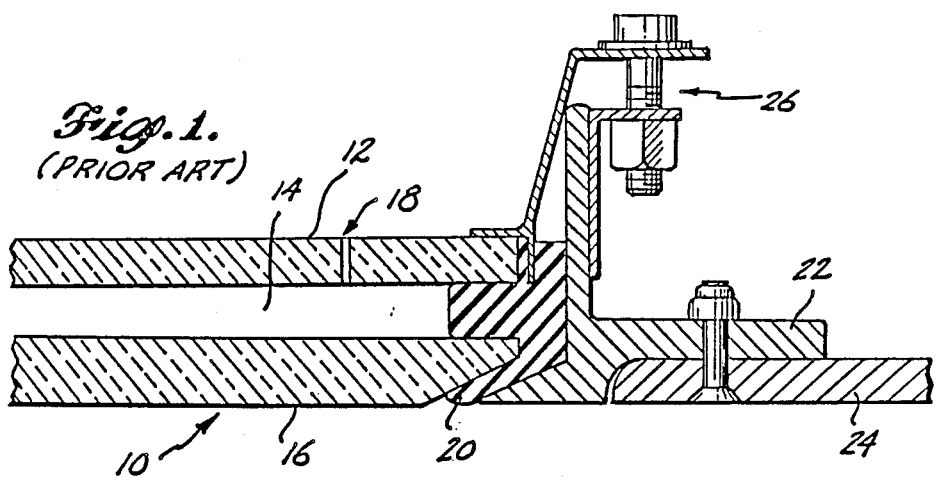

United States Patent [19]

Bain et al.

[11] Patent Number: 4,793,108
[45] Date of Patent: Dec. 27, 1988

[54] ENCLOSED INTERLAYER PLASTIC LAMINATED WINDOW

[75] Inventors: Peter H. Bain, Renton, Wash.; Brian L. Yaney, Silver Springs, Md.

[73] Assignee: The Boeing Company, Seattle, Wash.

[21] Appl. No.: 837,628

[22] Filed: Apr. 21, 1986

Related U.S. Application Data

[63] Continuation of Ser. No. 471,362, Mar. 1, 1983, abandoned.

[51] Int. Cl.⁴ .............................................. E06B 3/00
[52] U.S. Cl. ........................................ 52/208; 52/209; 52/789
[58] Field of Search ............... 52/788, 789, 790, 397, 52/398, 208

[56] References Cited

U.S. PATENT DOCUMENTS

| | | | |
|---|---|---|---|
| 2,379,194 | 6/1945 | Shonts et al. | 52/789 X |
| 2,409,808 | 10/1946 | Sowle | 52/208 X |
| 2,576,392 | 11/1951 | Downs | 52/209 X |
| 3,836,193 | 9/1974 | Donahoe | 52/789 X |
| 4,204,374 | 5/1980 | Olson | 52/208 |
| 4,324,373 | 4/1982 | Zibritosky | 52/397 X |

*Primary Examiner*—David A. Scherbel
*Assistant Examiner*—Creighton Smith
*Attorney, Agent, or Firm*—Conrad O. Gardner; B. A. Donahue

[57] ABSTRACT

Plastic laminated window 40 for aircraft passenger cabin having a peripheral edge insert 50 for providing additional shear-bearing area with respect to the chamfered peripheral edge portion 46 of the outer ply 44 of window 40.

1 Claim, 1 Drawing Sheet

ENCLOSED INTERLAYER PLASTIC LAMINATED WINDOW

This is a continuation, of application Ser. No. 471,362, filed Mar. 1, 1983 now abandoned.

The present invention relates to aircraft passenger cabin window panes and, more particularly, to an enclosed interlayer plastic laminated window pane for aircraft passenger cabin windows.

Present configuration commercial aircraft passenger windows comprise two monolithic plastic structural panes separated by an air gap An improved passenger window design comprises two panes laminated with an interlayer. While such improved passenger window is of importance from a weight-saving standpoint, such improved window pane comprising two panes laminated with an interlayer is susceptible to delamination and moisture ingress.

Accordingly, it is an object of the present invention to provide an enclosed interlayer plastic laminated window for aircraft passenger cabin utilization wherein edge sensitivity to delamination and moisture ingress is reduced.

It is yet another object of the present invention to provide, in a two-pane sandwich passenger window laminated with an interlayer, means for providing additional shear-bearing area around the periphery of the window.

It is yet another object of the present invention to provide a chamfered edge laminated window having means for allowing cabin pressure load experienced by the window to be reacted around the window edge by the window frame.

It is still another object of the present invention to provide an enclosed interlayer plastic laminated window having maximum bending stresses approximately 50% less than two-pane air gap separated type passenger cabin windows and to be accomplished with a lighter weight window.

In accordance with a preferred embodiment of the present invention, an enclosed interlayer plastic laminated window for aircraft passenger cabin comprises a plastic insert bonded between two plies around their periphery wherein the insert is equal in thickness to the interlayer and wherein the insert material is the same material as utilized in the two plies, thereby preventing water ingress and subsequent delamination while further providing increased strength in the peripheral critical shear-bearing area of the window pane.

Figure 2:
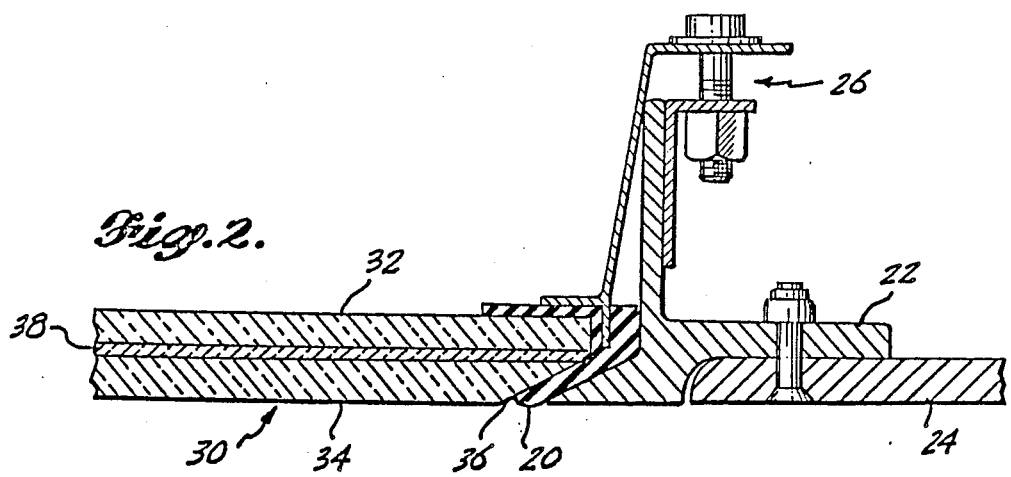
Figure 3:
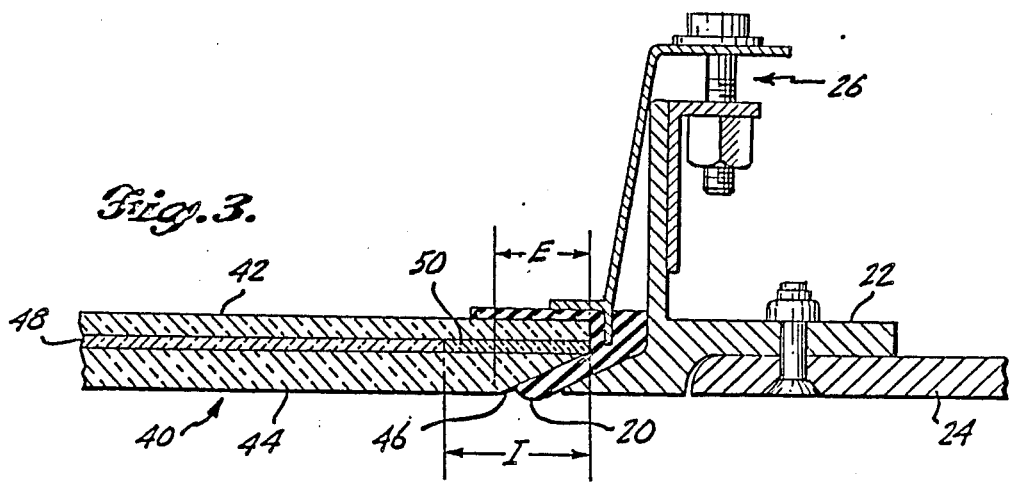

A full understanding of the present invention, and of its further objects and advantages and the several unique aspects thereof, will be had from the following description when taken in conjunction with the accompanying drawings in which FIG. 1 is a cross-sectional view of the exemplary prior art two-monolithic plastic structural pane window separated by an air gap and which further shows in detail the mounting assembly for the two-monolithic plastic structural pane window;

FIG. 2 is illustrative of an improved lightweight design aircraft cabin passenger window pane wherein the laminated pane comprises an inner ply relative to the cabin interior, an outer ply, and an interlayer between the inner ply and the outer ply; and, FIG. 3 is a cross-sectional view illustrative of the present enclosed interlayer plastic laminated window embodiment of the present invention wherein a chamfered edge window pane including an inner ply, an outer ply, and an interlayer further includes a peripherally disposed bonded-edge insert.

Turning now to FIG. 1, the passenger window of current commercial configuration is seen at 10 wherein an inner pane 12 (relative to the cabin air space) is seen separated by an air gap 14 from an outer pane 16. The two monolithic plastic structural panes, viz. inner pane 12 and outer pane 16 which are separated by air gap 14, are each capable of taking cabin pressure loads, a window 10 being provided at a typical commercial aircraft passenger window station It should be noted that only the outer pane 16 facing the aircraft exterior is carrying the pressure load during normal operation but, in the event of failure of outer pane 16, the load is transferred to inner fail-safe pane 12. Of importance in understanding the prior art aircraft window structure characteristics and those of embodiments according to the present invention, it should be noted that the outer pane 16 is designed to carry the ultimate pressure load, the inner pane is designed to carry the limit pressure load, and each works independently of the other. A breather hole in inner pane 12 is shown at 18 which, in normal operation, allows the outer pane 16 to carry the normal pressure loads and relieves the inner pane 14 from any pressure loading. Window frame 22 abuts outer skin 24 of the aircraft, and a retainer clip assembly 26 is connected between frame 22 and an inner edge support surface of inner pane 12. A seal member 20, disposed intermediate frame member 22, and peripheral edges of inner pane 12 and outer pane 16 completes the mounting assembly for passenger window 10.

Turning now to improved lightweight design passenger window 30 of FIG. 2, it can be noted that considerable weight savings can be achieved by utilizing a passenger window structure wherein an interlayer 38 is laminated between an inner ply 32 and an outer ply 34, the two plies laminated with an interlayer jointly carrying the ultimate load while either inner ply 32 or outer ply 34 can carry the fail-safe limit load alone. However, in the improved lightweight design passenger window 30 of FIG. 2, a laminated window pane structure is susceptible to delamination and to moisture ingress at the unprotected interlayer 38. Also of importance is that there is reduced shear thickness at chamfered window edge (an angle of 22°) 36.

Turning now to an embodiment of the present enclosed interlayer plastic laminated window 40, it will be seen that an outer ply 44 and inner ply 42 include therebetween an interlayer 48. A peripheral edge insert 50 is also shown. Outer ply member 44 comprises stretched acrylic material having a thickness of 0.22 inches; inner ply member 42 comprises stretched acrylic material having a thickness less than the thickness of outer ply 44, inner ply 42 thickness being 0.10 inches. Interlayer member 50 comprises plasticized polyvinyl butyl. Chamfered edge surface 46 of outer ply member 44 is done at an angle of 22° and extends in from the peripheral edge E a distance of 0.53 inches. Edge insert member 50 comprises cast acrylic and may be cast in place after laminating of window 40. Edge insert member 50 extends in a distance I from the peripheral edge of the window about 0.75 inches. The aforementioned figures regarding thickness of the various plies is given as exemplary of a typical configuration for a better understanding of the relative relationships of thicknesses. It should be noted that the thickness of the edge insert member 50 equals the thickness of interlayer member 48

The two separate fail-safe plies, viz. outer ply 44 and inner ply 42, are integrated by laminating them together, thereby providing a weight saving and, consequently, their thickness can be reduced substantially as they both combine to react structural ultimate loads It should be noted that inner ply member 42 is thinner relative to outer ply thickness 44 and is sized to react fail-safe limit loads with some assistance from broken pieces of outer ply member 44 which will be retained by interlayer member 48 Of importance is a comparison of the window structures of FIG. 3 with those exemplified by FIG. 2 wherein the estimated total thickness of acrylic of these laminated structures can be reduced from 0.57 inches total thickness in FIG. 2 to 0.32 total thickness as shown in FIG. 3.

In order to utilize the present current chamfered frame of the prior art as shown in FIGS. 1, 2, and 3 (which type of frame is desirable in order to provide flush installations), window edge 46 must be chamfered (e.g. 22°, as shown with the frame) The chamfer has, as a consequence, the effect of seriously reducing the average edge thickness at the support to tie point at which the laminate design, is no longer feasible As a consequence, the acrylic peripheral edge insert member 50 is positioned immediately behind the chamfer to provide additional supportive thickness which is additionally reinforced by the edge of the inner ply member 42 if the three components are bonded to form the integrated structure as shown in FIG. 3. An additional advantage of the structure of FIG. 3 is the resultant complete sealing of the edge against moisture ingress which would have a damaging effect upon the interlayer member 48. The aforementioned exemplary materials are normally employed in commercial airplane plastic window structures.

One manufacturing method for assembling the window structure of FIG. 3 would be completion of the laminated assembly without insert member 50 in an autoclave under the normal pressures, temperatures, and times used for such a sequence. The volume to be occupied by the edge insert member 50 would be filled with a temporary soft filler substance, e.g. a silicone rubber. After laminating, the temporary filler would be removed and the area cleaned. Acrylic resin would be introduced into the void and cured in place. Some type of edge dam would be needed to retain the resin while it was in its liquid state. After curing the window edge 46 would be cleaned up and polished. Window 40 would be installed in the aircraft in the same manner as previously done in FIG. 1, utilizing the assembly and seal hereinbefore described.

The present edge insert member 50, utilized in the window structure of FIG. 3, permits the cabin pressure load experienced by the window to be reacted around the window edge by the window frame 22, thus having the effect of stiffening the edge which was previously weakened when the thickness was reduced for weight reduction. A chamfered edge laminated window structure as shown in FIG. 2 cannot be utilized satisfactorily without the edge insert member concept shown in FIG. 3 unless the window is grossly over thickened, such action defeating the purpose of laminated window improvements. As previously noted, the thickness of interlayer member 48 is equal to the thickness of insert member 50 after lamination, but since insert member 50 is inserted as a liquid, as hereinbefore described, no problem is presented in thickness in manufacture. Edge insert member 50 is of the material compatible to bonding properties of the surrounding acrylic structure; the use of the base acrylic resin simplifies this manufacturing process. The width I, as hereinbelow described, is sufficient, in the example given, to enable those pressure loads gathered by the inner ply member 42 to be distributed to the window frame 22. The thickness of inner ply 42, relative to the outer ply 44, viz. thinner, as hereinbefore noted, where all the absolute thicknesses of these plies would vary with window geometry and size and with a degree of differential pressure.

As hereinabove noted, the FIG. 3 embodiment of the present invention introduces an additional transparent insert physically compatible with, and readily bondable between, the inner and outer ply members around their entire periphery, the insert effectively eliminating the edge sensitivity to delamination and moisture ingress and also providing additional critical shear area compared to the simple laminated structure of FIG. 2.

What is claimed is:

1. In combination in an aircraft passenger window station:
    a multilayer plastic window pane having an inner surface in the passenger cabin of the aircraft and an outer surface in the exterior of the aircraft;
    a chamfered frame assembly for supporting said multilayer plastic window pane;
    said multilayer plastic window pane having a first layer forming said inner surface, a second layer forming said outer surface, and a third layer intermediate said first layer and said second layer;
    said second layer having a chamfered peripheral edge portion;
    an cast acrylic edge insert member disposed between said chamfered peripheral edge portion and said first layer;
    said second layer having a thickness greater than the thickness of said first layer;
    said edge insert member having a thickness equal to the thickness of said third layer; and,
    wherein the thickness of said third layer is between about 0.03 inches and 0.06 inches.

* * * * *